(12) United States Patent
De Vos

(10) Patent No.: US 10,443,962 B2
(45) Date of Patent: Oct. 15, 2019

(54) HIGH TEMPERATURE HEAT EXCHANGER WITH CHROMIUM ABSORBER

(71) Applicant: Bosal Emission Control Systems NV, Lummen (BE)

(72) Inventor: Yves De Vos, Zemst (BE)

(73) Assignee: Bosal Emission Control Systems NV, Lummen (BE)

( * ) Notice: Subject to any disclaimer, the term of this patent is extended or adjusted under 35 U.S.C. 154(b) by 184 days.

(21) Appl. No.: 15/721,220

(22) Filed: Sep. 29, 2017

(65) Prior Publication Data

US 2018/0094883 A1  Apr. 5, 2018

(30) Foreign Application Priority Data

Oct. 4, 2016 (EP) ..................... 16192132

(51) Int. Cl.

| F28F 21/08 | (2006.01) |
|---|---|
| F28F 3/00 | (2006.01) |
| B32B 15/01 | (2006.01) |
| C22C 38/18 | (2006.01) |
| F28F 19/06 | (2006.01) |

(Continued)

(52) U.S. Cl.
CPC .............. *F28F 21/089* (2013.01); *F28F 3/00* (2013.01); *F28F 2245/06* (2013.01)

(58) Field of Classification Search
CPC .. F28F 21/089; F28F 3/00; F28F 19/06; F28F 2245/06; F28F 13/18; F28F 19/02; F28F 2245/00; B01D 53/14; B01D 53/64; B01D 2253/104; B01D 2253/1124; B01D 2255/20707; B01D 2257/60; B01D 2258/0208; B32B 15/013; C22C 38/18;
(Continued)

(56) References Cited

U.S. PATENT DOCUMENTS 4,873,061 A  * 10/1989 O'Hare ................. B01J 12/007
  422/186
2006/0099442 A1 * 5/2006 Tietz ........................ C23C 8/02
  428/640

(Continued)

FOREIGN PATENT DOCUMENTS

| DE | 102005015523 A1 | 10/2005 |
| DE | 102010002864 A1 | 9/2010 |

(Continued)

OTHER PUBLICATIONS

Search Report for European Patent Application No. 16192132.5, dated Apr. 5, 2017.

*Primary Examiner* — Justin M Jonaitis
(74) *Attorney, Agent, or Firm* — Merchant & Gould P.C.

(57) ABSTRACT

A high temperature plate heat exchanger with low chromium rejection for fluids above 550° C. and a method of cooling a gas is suggested. The heat exchanger comprises a plurality of heat transfer plates made of a chromium-containing alloy, particularly high-temperature stainless steel or Ni-based chromium-containing alloy and having two heat transfer surfaces. The plurality of heat transfer plates comprise at least on one heat transfer surface of the heat transfer plates a chromium absorber coating comprising porous titanium dioxide over at least a first portion of the length of said heat transfer surface. The chromium absorber coatings of two adjacent heat transfer plates are facing each other.

20 Claims, 2 Drawing Sheets

(51) Int. Cl.
    *H01M 8/04007*      (2016.01)
    *B01D 53/14*      (2006.01)
    *B01D 53/64*      (2006.01)
    *H01M 8/04014*      (2016.01)
    *F28D 21/00*      (2006.01)

(58) Field of Classification Search
    CPC .......... G01M 8/04074; G01M 8/04022; F28D 2021/0043
    USPC ........................................................ 165/133
    See application file for complete search history.

(56) References Cited

U.S. PATENT DOCUMENTS

2009/0010801 A1 *   1/2009   Murphy ............. B01D 46/0028
                                                                             422/4
2014/0057184 A1     2/2014   Pillai et al.

FOREIGN PATENT DOCUMENTS

EP            1630243   A2     3/2006
EP            3081295   A1    10/2016

* cited by examiner

HIGH TEMPERATURE HEAT EXCHANGER WITH CHROMIUM ABSORBER

This application claims benefit of Serial No. 16192132.5, filed on 4 Oct. 2016 in the European Patent Office and which application is incorporated herein by reference. To the extent appropriate, a claim of priority is made to the above disclosed application.

The present invention relates to a high temperature plate heat exchanger for fluids above 550° C., particularly above 600° C.

High temperature plate heat exchangers are needed for diverse applications for example in fuel cell technology, but other application fields arise in which such heat exchangers are needed. Generally, heat transfer plates of the plate heat exchanger have to display excellent heat transfer properties and therefore metallic materials made of specific alloys are inevitable. However, the heat transfer plates are at the same time exposed to very hot fluids and subject to corrosive conditions as the hot fluids flowing along the heat transfer plates typically comprise oxygen and other aggressive components at high temperature. Therefore, an essential property of such high temperature plate heat exchanger plates is a high stability against oxidation of the metallic plates.

The desired combination of properties for such high temperature plate heat exchangers would be complied with by oxide forming high temperature chromium containing alloys, which form an oxide layer on basis of chromium at the typical operating conditions of such high temperature plate heat exchangers. The layer protects the material from steady damage by oxidation. However, at temperatures above 650° C., the chromium oxide protective layer reacts for example with oxygen and/or water to form volatile hexavalent chromium compounds.

The chromium evaporation from the surface of the heat transfer plates were thought to be dramatically reducing the lifespan of a heat exchanger and therefore different methods of reducing chromium evaporation were suggested in literature, as for example applying aluminum rich layers onto the chromium containing metallic heat transfer plates. Another method consisting in applying layers comprising nickel, cobalt or iron on the surface of the metallic plates in such a way that under operation conditions a spinel-like oxidic coating is formed which reduces the chromium evaporation from the heat transfer plates. Another approach consists in forming an impermeable layer such as alumina on the surface of the heat transfer plates which would prevent chromium evaporation. Besides the method for forming such layer being laborious and expensive, micro-fissures form in the layers and therefore also only reduce chromium evaporation in aggressive operating conditions. These methods do not prevent the chromium from contaminating the fluid (gas) flowing through the plate heat exchanger.

However, it has been found that chromium evaporation process not only impairs in a limited way onto the durability of the heat exchanger, but is a huge issue for environmental considerations, as during the evaporation step, chromium is converted to highly toxic hexavalent chromium or for the durability and lifespan of a fuel cell, for example, as the chromium is toxic for the catalytically active layers on the electrodes.

In particular, local hot-spots of very high temperatures may occur at the surface of the heat transfer plates and promote the formation of hexavalent chromium substances volatile at these temperatures which contaminate the fluid.

And while hexavalent chromium is critical for the environment, hexavalent chromium may also accelerate degradation of technical devices, for example, of a fuel cell or of components of a fuel cell. Components of fuel cells may, for example, be reformers or afterburners. Deposits in the fuel cell slow down catalytic reactions and a voltage of the fuel cell system is reduced over time. Such a voltage drop may be accelerated by the deposition of hexavalent chromium in the fuel cell.

For reasons of energy efficiency and operation optimization, fuel cells, especially high temperature fuel cells such as, for example, high temperature solid oxide fuel cells (SOFCs), are often combined with heat exchangers. Heat gained in the exchanger may be used for preheating of a fluid then used in the fuel cell. Also, the energy in a warm or hot fluid leaving the fuel cell may be recuperated in a heat exchanger. For enhanced efficiency, the plate heat exchangers have a large surface area compared to hot tubes. Chromium evaporation being proportional to the hot surface area, the evaporation will be a particular issue for a plate heat exchanger than for a hot tube.

Therefore, although the chromium evaporation is reduced by using the methods known in the art, hexavalent chromium evaporating from the chromium containing heat transfer plates is not prevented from getting into the hot gas in contact with the heat transfer plates and contaminates the fluid leaving the heat exchanger. This toxic chromium may then be either transported into a fuel cell, for example, or an exhaust release towards the environment, and therefore makes a laborious removal processes inevitable.

Therefore, there is a need for an improved high temperature heat exchanger which prevents chromium evaporating from the heat transfer plates to leave the plate heat exchanger in the hot gaseous fluid passing.

It is therefore an object of the invention to suggest a high temperature plate heat exchanger which overcomes the above mentioned drawbacks and offers an improved plate heat exchanger.

These and other objects are achieved by the heat exchanger according to the invention, as it is specified by the features of the independent claim. Further advantageous aspects of the heat exchanger according to the invention are the subject of the dependent claims.

Particularly, a high temperature plate heat exchanger with low chromium rejection for fluids above 550° C. is suggested. The plate heat exchanger comprises a plurality of heat transfer plates made of a chromium-containing alloy, particularly high-temperature stainless steel or Ni-based chromium-containing alloy, having two heat transfer surfaces. The plurality of heat transfer plates comprise at least on one heat transfer surface of the heat transfer plates a chromium absorber coating comprising porous titanium dioxide over at least a first portion of the length of said heat transfer surface. The chromium absorber coatings of two adjacent heat transfer plates are facing each other.

Low chromium rejection is to be understood as the gas leaving the heat exchanger has a chromium content of less than 100 ppm in mass, in particular less than 20 ppm in mass, very particularly less than 1 ppm in mass.

The length of the portion(s) on which the coating(s) is (are) arranged are to be understood in the direction from an inlet opening to an outlet opening of a corresponding flow channel transporting the corresponding fluid in operation.

The present invention relates to a high temperature plate heat exchanger such as a preheater for heating fluids. The preheater may in particular heat incoming cold fluids (eg. air, combustibles) before entering a power generating unit (e.g. fuel cell stack or micro-gas turbine or Stirling engine). The preheater may particularly use the heat from the hot gas flow generated by the power unit (combustion gas) for heating the incoming fluids. The heat exchanger may also be a reformer.

Porous titanium oxide layer under certain operational conditions acts as chromium absorbent when arranged at the surface of a heat exchanger plate.

Accordingly, the chromium absorber coating forms a barrier at operating temperatures of the plate heat exchanger at which chromium evaporation occurs from the chromium containing heat transfer plate. Hence, chromium is prevented from contaminating the fluid passing the plate heat exchanger.

The high temperature heat exchanger comprises chromium containing steel components and has large surface areas. Thus, when heated to high temperatures, typically above 650 degree Celsius, hexavalent chromium may form. Hexavalent chromium mainly forms $CrO_2(OH)_2$. This and other hexavalent chromium compounds being volatile are then transported by the gas flow passing through the heat exchanger and would in conventional applications be led to the environment or to a fuel cell connected to the heat exchanger.

According to the present invention, the hexavalent chromium released by the heat transfer plate of the heat exchanger is now absorbed by a porous titanium dioxide absorber arranged at the surface of the heat exchanger plate before reaching and contaminating the fluid passing the plate heat exchanger.

Hence, the hot gas is passed through the plate heat exchanger according to the invention has low chromium rejections and may then be further transported, for example to the environment or to a fuel cell in fluid connection with the heat exchanger.

The plate heat exchanger has hot gas flow channels for transporting the hot gas through the plate heat exchanger and cooling fluid flow channels for transporting the cooling fluid through the plate heat exchanger.

According to a further aspect of the high temperature plate heat exchanger according to the invention, the chromium-containing alloy the heat transfer plates are made of contains 10% in mass or more, particularly 20% in mass or more, very particularly 25% in mass or more metallic chromium.

The invention is particularly advantageous for high temperature alloys containing such high amounts of chromium leading to high chromium evaporation at the operating temperature. The chromium absorber coating prevents the chromium from contaminating the fluids passing the plate heat exchanger.

In particular, the chromium absorber coating may further comprise aluminum oxide.

In a further aspect of the high-temperature plate heat exchanger according to the invention, the plurality of heat transfer plates comprise on at least one heat transfer surface of the heat transfer plates a second coating over at least a second portion of the length of said heat transfer surface and having a different composition from the chromium absorber coating arranged at the first portion. The second coating may comprise porous aluminum oxide or porous titanium oxide having a composition different from the first coating.

The combination of such coatings having different compositions allows for fine tuning of the properties of the plate heat exchanger, for example allowing a catalytical oxidation of combustibles present in the hot gas to be cooled in the presence of catalytically active substances in the coating.

In another aspect of the high-temperature heat exchanger according to the invention, at least a portion of the chromium absorber coating further comprises a catalytically active substance such as Pd, Pt, Ru, promoting a catalytical oxidation of combustible such as $H_2$ or hydrocarbons.

According to another aspect according to the invention, at least a portion of the second coating further comprises a catalytically active substance such as Pd, Pt, Ru or Ni/Rh promoting a catalytical oxidation of combustible such as $H_2$ or hydrocarbons.

The combination of coatings of different compositions over the length of the heat transfer plates may be particularly advantageous. When a hot gas containing combustibles is lead over a first coating portion which does not contain any catalytically active substances will allow the hot gas to cool down before passing a second coating portion comprising, for example, catalytically active substances which will then lead to exothermic catalytic oxidation of the combustible in the hot gas at a reduced temperature. Such an arrangement will lead to a better control of the hotspot temperature within a range in which the plate heat exchanger is not deteriorated. Alternatively to a coating without catalytically active substances, the coating may be only arranged on a first portion of the heat transfer plate, leaving a second portion of the heat transfer plate without coating. If a behavior as described above in which the hot gas is first let cool down in absence of catalytically active substances before undergoing exothermic catalytical oxidation, the hot gas may enter the plate heat exchanger at the end at which no coating is arranged on the surface of the heat transfer plate, ie. the second portion, before passing by the coated first portion of the heat transfer plate, where the coating comprises catalytically active substances.

According to a further aspect of the high temperature heat exchanger according to the invention, the plurality of heat transfer plates comprise a chromium absorber coating comprising porous titanium dioxide over at least part of the length of both heat transfer surfaces of the heat transfer plates.

This aspect of the invention will prevent the chromium contamination of the cooling fluid in case the second fluid and in particular the surface of the heat transfer plate rises to 700° C. and more.

In accordance with yet another aspect of the invention high temperature heat exchanger according to the invention, the heat exchanger comprises openings for the fluids to enter and to exit the heat exchanger and wherein the portion comprising said porous titanium dioxide coating is arranged at one end of said heat transfer plates closest to one opening of the heat exchanger.

This arrangement allows for the hot gas to enter the plate heat exchanger at temperatures above 700° C., for example, on the side where the chromium absorber coating prevents contamination of the hot gas with chromium emanating from the chromium evaporation from the heat transfer plates at such high temperatures.

The thickness of the coating layer may be 40-100 μm.

The length of TiO2 layer, particularly is 2% to 25% of the total length of the surface of the heat transfer plate from an inlet opening to an outlet opening of a corresponding flow channel.

The invention further relates to a method of cooling a fluid in a heat exchanger, the method comprising the steps of:
providing a hot gas having a temperature of at least 650° C., preferably at least 700° C.;
providing a cooling fluid;
guiding the hot gas and the cooling fluid through a plate heat exchanger according to any one of claims 1 to 6;

letting hexavalent chromium generated at the surface of the heat transfer plate react with the titanium oxide surface of the heat transfer plates, thereby reducing the hexavalent chromium to trivalent chromium, and thus preventing the chromium from contaminating the hot gas and/or the cooling fluid passing through the heat exchanger.

The hot gas and cooling fluids are guided through corresponding hot gas flow channels and cooling fluid flow channels of the plate heat exchanger.

Advantages were already described for the high-temperature plate heat exchanger and apply to the method in an analogous way.

According to a further aspect of the method according to the invention, the hot gas contacts the porous titanium dioxide coating of the heat transfer plate at a temperature of at least 700° C.

The method according to the invention is particularly advantageous when the hot gas enters the plate heat exchanger at temperatures above 700° C. at which temperature the chromium evaporation is particularly critical.

In accordance with another aspect of the invention, the chromium absorber coating is arranged on the heat transfer plate surfaces in contact with the hot gas provided.

In case the plate heat exchanger is used as a reformer, the chromium absorber coating is arranged on the heat transfer plate surfaces in contact with the fluid comprising the combustible and oxidizing component.

In a particular aspect of the invention, the chromium absorber coating is additionally arranged on the heat transfer plate surfaces in contact with the cooling fluid provided.

In accordance with still a further aspect of the method according to the invention, the hot gas further comprises combustible, such as $H_2$ or hydrocarbons and an oxidizing component such as $O_2$.

The presence of combustible and oxidizing component allows for exothermic catalytical oxidation of the combustible in presence of catalytically active substances in the coating and further used the oxidizing energy of the hot gas for heating up the cooling fluid.

In accordance with a further aspect of the method according to the invention, the titanium coating contains catalytic substances, such as Pd, Pt, Ru, Ni/Rh, promoting an oxidation of the combustible.

In another aspect of the method according to the invention, the hot gas containing the combustible and the oxidant is directed over the heat transfer plates and the exothermic combustion reaction takes place and further heats up the cooling fluid to be heated.

According to a further aspect of the method according to the invention, the portion comprising the porous titanium dioxide coating is situated at the entrance of the hot gas to be cooled. Particularly, the hot gas has temperatures of 600° C. and more, in particular 650° C. and more, very particularly 700° C. and more.

In accordance with a further aspect of the method according to the invention, the gas leaving the heat exchanger, in particular the hot gas cooled, has a chromium content of less than 100 ppm in mass, in particular less than 20 ppm in mass, very particularly less than 1 ppm in mass.

Additionally, in some preferred embodiments of the method according to the invention, a hot gas already containing an amount of hexavalent chromium may be provided and guided over the heat exchanger according to the present invention, the hexavalent chromium in the hot gas additionally reacting with the titanium oxide surface of the coating of the heat transfer plate removing the hexavalent chromium in the hot gas, thereby thus forming a hot gas having a reduced amount of hexavalent chromium.

The so treated and purified hot gas—purified from hexavalent chromium—may then be further transported, for example to the environment or to a fuel cell in fluid connection with the catalyst.

By letting the hexavalent chromium containing hot gas react with or get captured at a titanium oxide surface in the heat exchanger, further transport of hexavalent chromium may be prevented or at least limited. In addition, with the method according to the invention, hexavalent chromium deposition is directly incorporated into a high temperature process, without requiring further activation energy or energy source for the chemical reaction to take place.

The term 'reduced amount' of hexavalent chromium is herein understood as being an amount of hexavalent chromium, which is smaller than the amount of hexavalent chromium in the hot gas before reacting with the titanium oxide surface of the catalytic element. 'Reduced amount' also includes an amount corresponding to zero or an amount, which is too small to be detected, respectively. The 'reduced amount' of hexavalent chromium may basically be in any range between 0 percent and <100 percent of the amount of hexavalent chromium in the hot gas before being trapped by the titanium oxide surface on the heat transfer plate.

In some embodiments of the method according to the invention, the hot gas having a reduced amount of hexavalent chromium compared to the hot gas having an amount of hexavalent chromium has a reduced amount of hexavalent chromium, which reduced amount of hexavalent chromium is reduced by at least 50 percent, preferably by at least 90 percent, more preferably by at least 99 percent, most preferably by at least 99.7 percent of the amount of hexavalent chromium in the hot gas before the hot gas is treated in the titanium catalyst according to the invention. A hexavalent chromium reduction may be very effective with the method and the catalyst according to the invention and may even completely remove the hexavalent chromium content of hot gas treated in the catalyst.

Preferably, the heat exchanger is configured such that less than 100 ppm in mass, in particular less than 20 ppm in mass, very particularly less than 1 ppm in mass of chromium leaves the heat exchanger according to the invention.

In some preferred embodiments of the method according to the invention, the method comprises the step of guiding the hot gas having a reduced amount of hexavalent chromium content into a fuel cell system, preferably into a high temperature fuel cell system such as for example a SOFC system. After that hexavalent chromium in the hexavalent chromium containing hot gas has been trapped by the titanium oxide surface of the catalytic element, the hot gas having passed the titanium oxide surfaces comprises a reduced amount of hexavalent chromium. This hot gas containing a reduced amount of hexavalent chromium is then guided into the fuel cell system arranged downstream of the catalytic element. The fuel cell system may be a single fuel cell or a plurality of fuel cells, for example a fuel cell stack. The fuel cell system may, for example, also comprise further fuel cell components such as for example reformers or afterburners.

In the method according to the invention, the hot gas is provided by of a fuel cell system. Alternatively or additionally the fluid heated in the heat exchanger is guided into a fuel cell system.

A surface structure of heat transfer plate may be advantageous and the heat transfer plates may therefore comprise corrugations or sine-wave profiles.

Each and every feature described herein, and each and every combination of two or more of such features, is included within the scope of the present invention provided that the features included in such a combination are not mutually inconsistent.

In addition, any feature or combination of features may be specifically excluded from any embodiment of the present invention.

The invention is further described with regard to embodiments, which are illustrated by means of the following drawings, wherein:

FIGS. 1a, 1b and 1c depict a side view of three different embodiments of the plate heat exchanger according to the present invention;

FIG. 2 exemplifies a temperature profile at the surfaces of the heart transfer plates in operation;

Figure 1A:
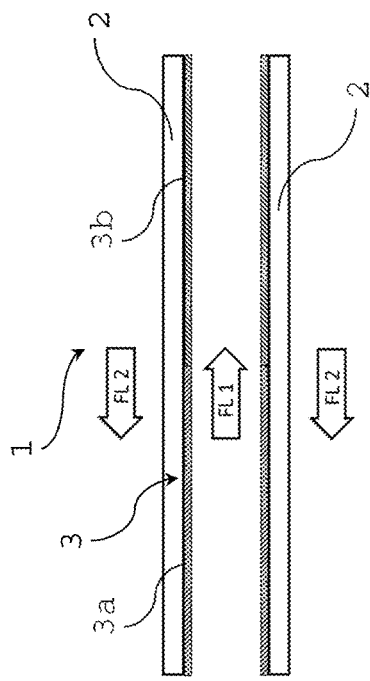
FIGS. 1a to 1c show diverse embodiments according to the present invention, wherein the coating 3 is only arranged on one surface of the heat transfer plate 2.

In FIG. 1a, a titanium dioxide coating 3 acting as chromium absorber at temperatures of 550° C. and more is arranged on the surface of heat transfer plates 2 made of a chromium-containing alloy in contact with the hot gas FL1 provided to the heat exchanger. The other face of the heat transfer plate 2 is in contact with the cooling fluid FL2 and does not comprise a coating on its surface. The chromium absorber coating may alternatively be arranged over a portion of the length of the heat transfer surface only. The chromium absorber coating is arranged on the surfaces of two adjacent heat transfer plates 2 facing each other.

Figure 2:
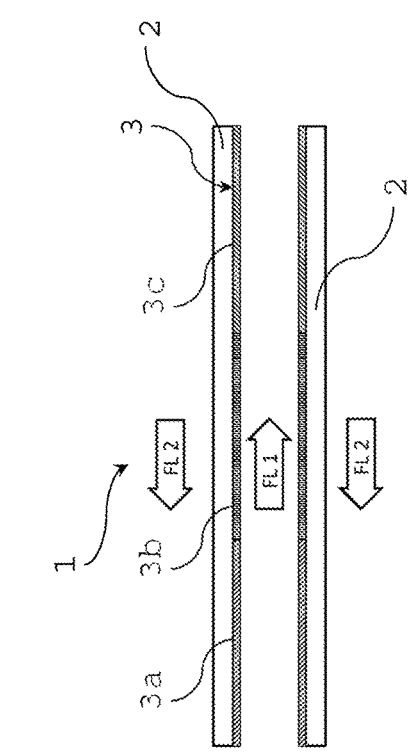
Figure 3B:
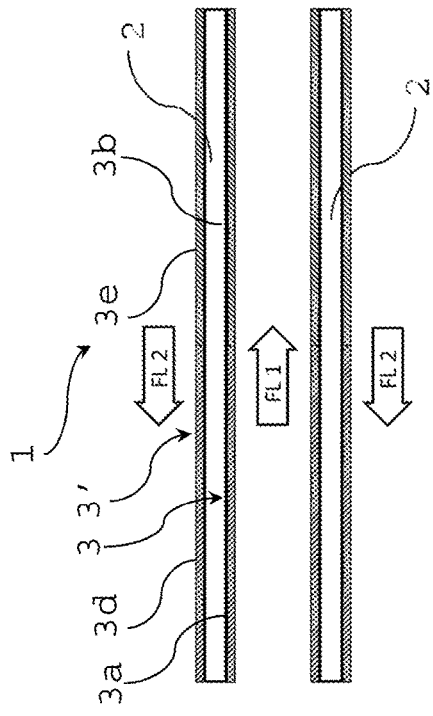
FIGS. 3a, 3b, 3c and 3d depicts a side view of three further embodiments of the plate heat exchanger according to the present invention.
Figure 3D:
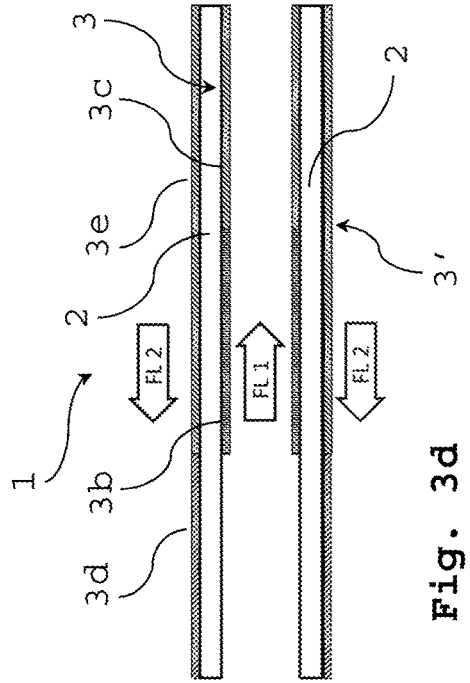
Figure 3A:
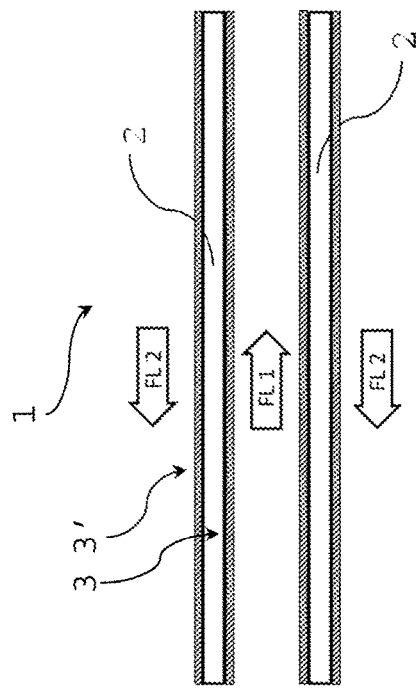
Figure 3C:
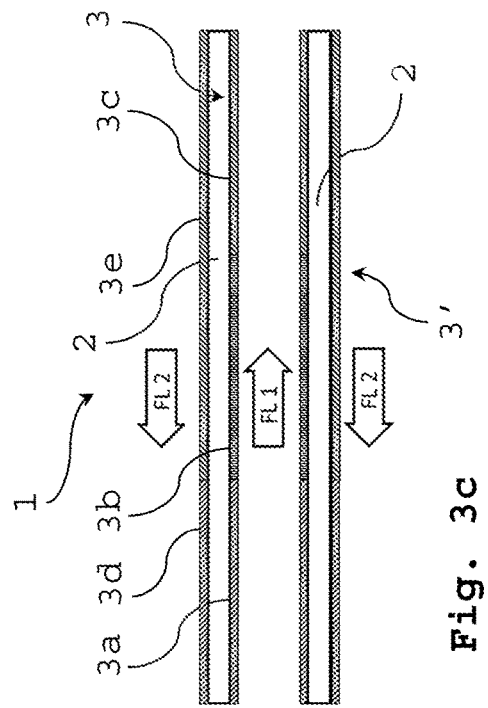

The titanium dioxide coating may further comprise the catalytically active substance such as Pd, Pt, Ru, Ni/Rh, etc. promoting a catalytic oxidation of combustible such as $H_2$ or hydrocarbons which might be present in the hot gas FL1. Such catalytic oxidation will further increase the energy supply to the cooling fluid FL2 through the heat transfer plate 2. Depending on the presence of combustibles in the hot gas FL1 and on the catalytic oxidation rate, the temperature may further increase over a portion of the heat transfer plate 2 due to the exothermic combustion reaction before declining due to the heat transfer through the heat transfer plate 2. Such behavior of the temperature profile is exemplified in FIG. 2.

Figure 1C:
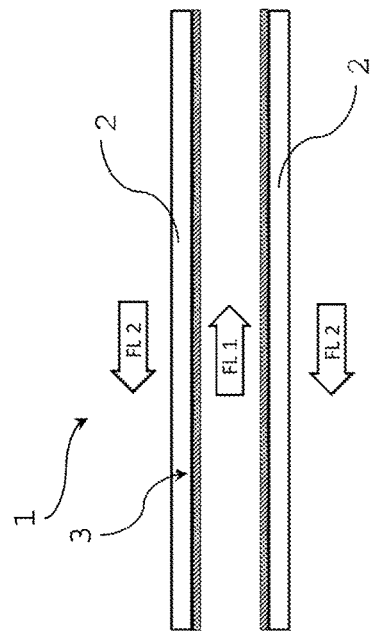
Figure 1B:
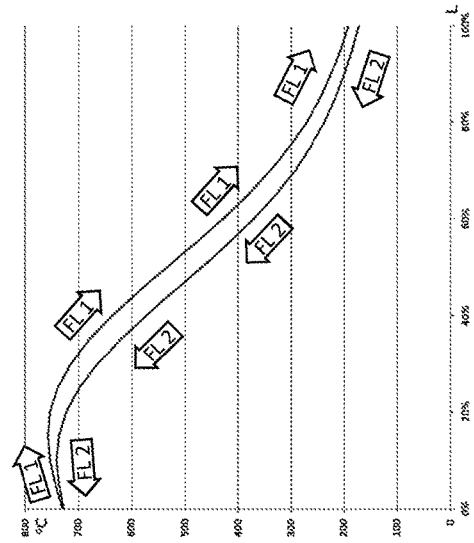

FIGS. 1b and 1c show other arrangements of the coating on the surface of the heat transfer plate 2. In these embodiments, a titanium dioxide coating 3a acting as chromium absorber is arranged over only a portion 3a of the length of the surface of heat transfer plates 2 in contact with the hot gas FL1 provided to the heat exchanger. The chromium absorber coating 3a is arranged at the entrance of the hot gas FL1 where the temperature of the hot gas FL1 to be cooled is highest before being cooled down by energy exchange through the heat transfer plate 2. Again, depending on the presence of combustible and of the catalytic oxidation rate, the temperature of the hot gas FL1 may first increase before decreasing over the flow path length through the plate heat exchanger as described for FIG. 1a.

In the case of FIG. 1b, a second coating 3b is arranged on a second portion 3b of the heat transfer plate 2. In an analogous way, the embodiment shown in FIG. 1c has a third coating arranged on a third portion 3c of the heat transfer plate 2. These different coatings may be, for example, porous titanium dioxide comprising or not certain substances as for example catalytically active substances which may be present in different amounts in the corresponding coatings 3a, 3b, 3c. Alternatively, the coatings may differ from one another by their composition. The coatings may then comprise, for example, aluminum oxide which may additionally comprise catalytically active substances.

In some embodiments, it may be advisable to have a first coating portion 3a being in contact with the hot gas FL1 which does not contain any catalytically active substances in order to have the hot gas FL1 cooled down before passing a second coating portion 3b comprising catalytically active substances. At the contact with this second portion 3b comprising catalytically active substances, the hot gas FL1 containing a combustible and an oxidizing component will undergo exothermic catalytic oxidation of the combustible in the hot gas FL1 at a reduced temperature and hence lead to better control of the hotspot temperature. The temperature may then be maintained in a range in which the plate heat exchanger is not deteriorated. In case the hot gas FL1 enters the plate heat exchanger at very high temperature on a portion of the coating on which catalytic oxidation takes place, very high hotspot temperatures may be reached which may be above the maximum operating temperature of the plate heat exchanger. Alternatively to a coating without catalytically active substances, coating may be only arranged on a second portion 3b of the heat transfer plate 2, leaving the first portion 3a of the heat transfer plate 2 without coating.

Although chromium evaporation is mainly observed at temperatures above 650° C., it may be advantageous to arrange the chromium absorber coating such that it extends to the part of the plate heat exchanger having a temperature below 650° C., although no chromium evaporation is to be expected anymore. However, small amounts of chromium may pass the chromium absorber barrier and contaminate the gas FL1 to be cooled. The chromium absorber being effective at temperatures above 550° C., such chromium absorber extending to a portion of the heat transfer plate 2 being exposed at a temperature of less than 650° C. but more than 550° C. will result in an absorption of chromium contaminating of the gas FL1 to be cooled.

As shown in the embodiments in FIGS. 3a to 3d, it may be particularly advantageous to arrange coatings 3, 3' on both sides of the heat transfer plate 2. This is particularly the case when the second fluid and in particular the surface of the heat transfer plate 2 rises to 700° C. and more. In this case, chromium evaporation is also to be expected to contaminate the cooling fluid FL2. If the cooling fluid FL2 is then conveyed to a fuel cell, the chromium may poison the electrodes of the fuel cell, thereby impairing the efficiency of the fuel cell. Additionally, the chromium absorber 3' on the surface of the heat transfer plate 2 in contact with the cooling fluid FL2 may also act as decontaminator in case some chromium evaporation occurred before the cooling fluid FL2 enters the plate heat exchanger and contaminating the cooling fluid FL2.

Again, the coating 3' on the second face of the heat transfer plate 2 may be subdivided into several portions 3d, 3e, . . . comprising different compositions for the coating or the coating may only cover part of the length of the heat transfer plate 2. The lengths of the different portions 3a, 3b, 3c, 3d, 3e, . . . of the coatings do not have to correlate from one surface to the other surface 3, 3' of the heat transfer plate 2.

Accordingly, the use of the plate heat exchanger for hot gas FL1 according to the invention results in very low residual chromium amount in the hot gas cooled FL1 or in the cooling fluid FL2, and in particular the fluids leaving the plate heat exchanger have a chromium content of less than 100 ppm in mass, in particular less than 20 ppm in mass, very particularly less than 1 ppm in mass These embodiments show the high versatility of the present invention offering the possibility to flexibly design heat transfer plates for accommodating to the needs of the plate heat exchanger.

The invention claimed is:

1. High temperature plate heat exchanger with low chromium rejection for fluids above 550° C., wherein the heat exchanger comprises a plurality of heat transfer plates made of a chromium-containing alloy and having two heat transfer surfaces, and wherein the plurality of heat transfer plates comprise at least on one heat transfer surface of the heat transfer plates a chromium absorber coating comprising porous titanium dioxide over at least a first portion of the length of said heat transfer surface, the chromium absorber coatings of two adjacent heat transfer plates facing each other.

2. Plate heat exchanger according to claim 1, wherein the chromium-containing alloy the heat transfer plates are made of contains 10% in mass or more of metallic chromium.

3. Plate heat exchanger according to claim 1, wherein the plurality of heat transfer plates comprise on at least one heat transfer surface of the heat transfer plates a second coating over at least a second portion of the length of said heat transfer surface and having a different composition from the chromium absorber coating arranged at the first portion.

4. Plate heat exchanger according to claim 1, wherein at least a portion of the chromium absorber coating further comprises a catalytically active substance for promoting a catalytic oxidation of a combustible.

5. Plate heat exchanger according to claim 3, wherein at least a portion of the second coating further comprises a catalytically active substance for promoting a catalytic oxidation of a combustible.

6. Plate heat exchanger according to claim 1, wherein the plurality of heat transfer plates comprise a chromium absorber coating comprising porous titanium dioxide over at least part of the length of both heat transfer surfaces of the heat transfer plates.

7. Plate heat exchanger according to claim 1, wherein the heat exchanger comprises openings for the fluids to enter and to exit the heat exchanger and wherein the portion comprising said porous titanium dioxide coating is arranged at one end of said heat transfer plates closest to one opening of the heat exchanger.

8. Method of cooling a gas in a heat exchanger, the method comprising the steps of:
providing a hot gas (FL1) having a temperature of at least 650° C.;
providing a cooling fluid (FL2);
guiding the hot gas (FL1) and the cooling fluid (FL2) through a plate heat exchanger according to claim 1;
letting hexavalent chromium generated at the surface of the heat transfer plate react with the titanium oxide coating on the heat transfer plates, thereby reducing the hexavalent chromium to trivalent chromium, and thus preventing the chromium from contaminating the hot gas (FL1) and/or the cooling fluid (FL2) passing through the heat exchanger.

9. Method according to claim 8, wherein the hot gas (FL1) contacts the porous titanium dioxide coating of the heat transfer plate at a temperature of at least 700° C.

10. Method according to claim 8, wherein the chromium absorber coating is arranged on the heat transfer plate surfaces in contact with the hot gas (FL1) provided.

11. Method according to claim 10, wherein the chromium absorber coating is additionally arranged on the heat transfer plate surfaces in contact with the cooling fluid (FL2) provided.

12. Method according to claim 8, wherein the hot gas (FL1) provided further comprises a combustible and an oxidizing component.

13. Method according to claim 8, wherein the hot gas (FL1) provided containing the combustible and the oxidant is directed over the heat transfer plates and the exothermic combustion reaction takes place and further heats up the cooling fluid (FL2).

14. Method according to claim 8, wherein the portion comprising the porous titanium dioxide coating is arranged at the entrance of the hot gas (FL1) into the plate heat exchanger.

15. Method according to claim 8, wherein the hot gas cooled (FL1) and the cooling fluid heated (FL2) leaving the plate heat exchanger, independently, have a chromium content of less than 100 ppm in mass.

16. Plate heat exchanger according to claim 1, wherein the chromium-containing alloy is a high-temperature stainless steel or a Ni-based chromium-containing alloy.

17. Plate heat exchanger according to claim 2, wherein the chromium-containing alloy the heat transfer plates are made of contains 25% in mass or more of metallic chromium.

18. Plate heat exchanger according to claim 4, wherein the catalytically active substance comprises Pd, Pt, or Ru, and the combustible comprises $H_2$ or hydrocarbons.

19. Method according to claim 12, wherein the combustible comprises $H_2$ or hydrocarbons and the oxidizing component comprises $O_2$.

20. Method according to claim 15, wherein the hot gas cooled (FL1) and the cooling fluid heated (FL2) leaving the plate heat exchanger, independently, have a chromium content of less than 20 ppm in mass.

* * * * *